US008001669B2

(12) United States Patent
Holland et al.

(10) Patent No.: US 8,001,669 B2
(45) Date of Patent: Aug. 23, 2011

(54) PRESSURIZED CLEANING OF A TURBINE ENGINE COMPONENT

(75) Inventors: Brian K. Holland, Lansing, MI (US); Dennis R. Krum, Laingsburg, MI (US)

(73) Assignee: United Technologies Corporation, Hartford, CT (US)

( * ) Notice: Subject to any disclaimer, the term of this patent is extended or adjusted under 35 U.S.C. 154(b) by 277 days.

(21) Appl. No.: 11/862,584

(22) Filed: Sep. 27, 2007

(65) Prior Publication Data

US 2009/0083960 A1 Apr. 2, 2009

(51) Int. Cl.
*B23P 6/00* (2006.01)

(52) U.S. Cl. ............... 29/402.04; 29/402.01; 29/402.02; 29/889.1; 134/169 A

(58) Field of Classification Search ................. 29/889.1, 29/402.01, 402.02, 402.04, 402.18, 407.05, 29/407.08; 134/169 A, 40; 60/779; 210/490; 422/180
See application file for complete search history.

(56) References Cited

U.S. PATENT DOCUMENTS 3,837,660 A * 9/1974 Poggio .......................... 277/549
4,004,416 A 1/1977 Amelio et al.
4,257,735 A * 3/1981 Bradley et al. ................ 277/303
4,931,104 A * 6/1990 Burke ............................ 134/40
5,339,845 A * 8/1994 Huddas ..................... 134/169 A
5,561,977 A * 10/1996 Harada et al. ................... 60/779
5,575,858 A 11/1996 Chen et al.
5,679,174 A * 10/1997 Buongiorno ............... 134/22.18
5,758,486 A 6/1998 Fetescu
5,954,962 A * 9/1999 Adiletta ........................ 210/490
6,019,853 A 2/2000 Banville et al.
6,060,177 A 5/2000 Bornstein et al.
6,273,426 B1 * 8/2001 Daoud et al. .................. 277/303
6,394,108 B1 5/2002 Butler
6,537,384 B2 * 3/2003 Herwig et al. .................. 134/40
6,645,926 B2 11/2003 Abriles et al.
7,025,356 B1 * 4/2006 Cheung et al. ................ 277/415
7,093,993 B2 8/2006 Skoog et al.
7,146,990 B1 12/2006 Ngo et al.
7,185,663 B2 3/2007 Koch et al.
7,572,416 B2 * 8/2009 Alward et al. ................ 422/180
2003/0091426 A1 * 5/2003 Griggs .............................. 415/1

* cited by examiner

*Primary Examiner* — Rick K Chang
(74) *Attorney, Agent, or Firm* — Carlson Gaskey & Olds PC

(57) ABSTRACT

A method of repairing a turbine engine component includes providing a turbine engine component having a first surface and a second surface. A porous structure extends from the first surface to the second surface. The first surface is exposed to a first pressure and the second surface is exposed to a second pressure. The first pressure is higher than the second pressure. A difference between the first pressure and the second pressure is used to pass a cleaning liquid through the porous structure from the first surface to the second surface.

9 Claims, 2 Drawing Sheets

PRESSURIZED CLEANING OF A TURBINE ENGINE COMPONENT

BACKGROUND OF THE INVENTION

This invention relates to a method of cleaning a component, such as a turbine engine component.

A turbine engine has a number of components, such as a fan, a low pressure compressor, a high pressure compressor, a combustor, a low pressure turbine, a high pressure turbine and air oil seals. These components may require periodic cleaning as part of a repair and maintenance program. Some of these components, such as an air oil seal, are made of a composite material, such as fiberglass, carbon fiber, or aramid fabric. Due to the porous nature of this material, traditional surface cleaning techniques are ineffective at removing oil deposits set within the pores of the composite material. It may become necessary to remove this oil as part of a repair process. For example, oil may interfere with patching a leak in the air oil seal because of the incompatibility of the oil and the adhesive used for patching.

A need therefore exists for a cleaning method to remove oil residue from a turbine engine component.

SUMMARY OF THE INVENTION

A turbine engine component has a first surface and a second surface. A pore structure extends from the first surface to the second surface. The first surface is exposed to a first pressure while the second surface is exposed to a second pressure. The first pressure is higher than the second pressure. The difference between the first pressure and the second pressure is used to pass a cleaning liquid through the pore structure from the first surface to the second surface.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
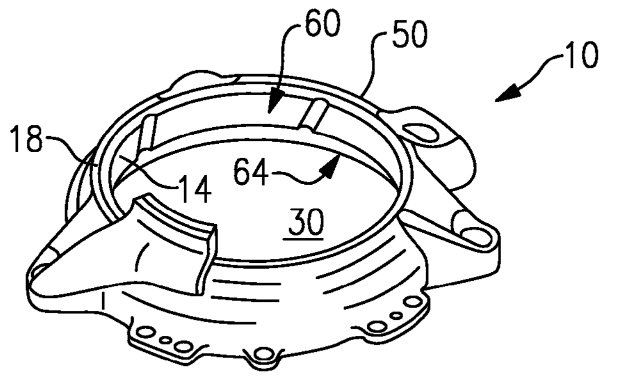
FIG. 1 illustrates a perspective view of a turbine engine component with a first surface and a second surface.
Figure 2:
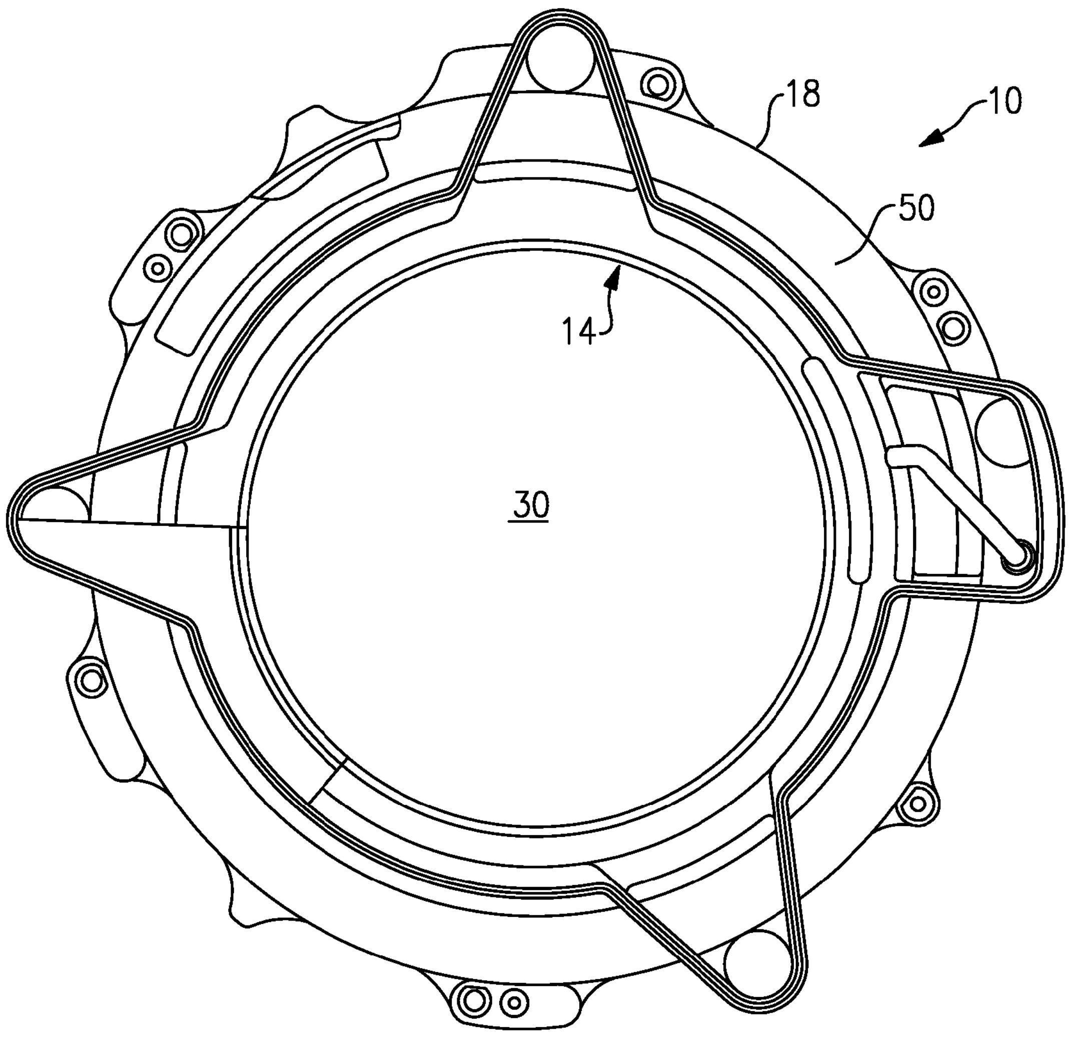
FIG. 2 illustrates a bottom view of the turbine engine component of FIG. 1, illustrating the location of the first surface relative to the second surface.

With reference to FIGS. 1 and 2, there is shown a turbine engine component 10. Here, turbine engine component 10 is an air oil seal used to seal a bearing housing around bearings of a turbine engine. Turbine engine component 10 has first surface 14 and second surface 18 and has first opening 60 and second opening 64. First surface 14, a curved surface, defines at least in part interior volume 30. Turbine engine component 10 may comprise composite material 50, such as a fibrous material like fiberglass, carbon fiber or aramid fabric.

Due to the proximity of turbine engine component 10 to oil, composite material 50 may become soaked with oil. As part of a repair of turbine engine component 10, it may become necessary to patch a leak that may develop between first surface 14 and second surface 18. Oil impregnating turbine engine component 10 between first surface 14 and second surface 18 should be removed. Otherwise, adhesives used to repair the leak in turbine engine component 10 may be ineffective. Because oil is located between first surface 14 and second surface 18, traditional techniques for cleaning first surface 14 and second surface 18 are ineffective at removing oil residue impregnating turbine engine component 10.

To prepare turbine engine component 10 for the inventive cleaning technique, turbine engine component 10 is cleaned ultrasonically as known. Turbine engine component 10 is then cleaned by using a solvent on its surfaces, such as first surface 14 and second surface 18. Following this preparation, turbine engine component 10 is ready for cleaning.

Figure 3:
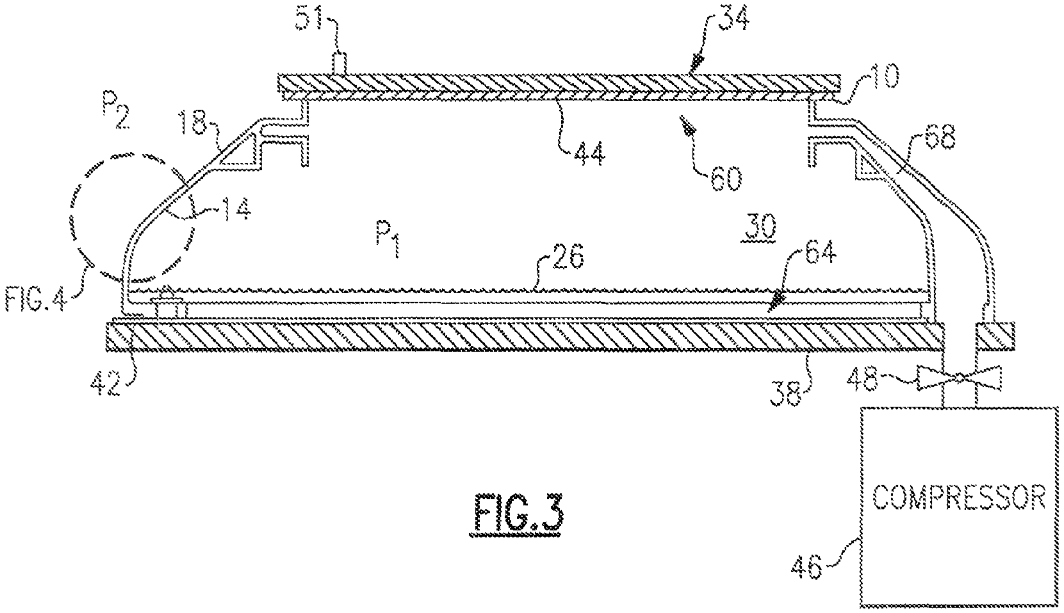
FIG. 3 illustrates the turbine engine component of FIGS. 1-2 ready for cleaning with cleaning liquid disposed within an interior volume of the turbine engine component.

With reference to FIG. 3, turbine engine component 10 is sealed at second opening 64 by bolting second sealing plate 38. Cleaning liquid 26, which may be a solvent such as an alcohol (for example, isopropyl alcohol), is then poured into interior volume 30 through first opening 60 until approximately 10% of its volume is filled. First opening 60 is then sealed by bolting first sealing plate 34. First sealing plate 34 and second sealing plate 38 may be made of a rigid material, such as steel. Rubber seal 42 is used between first sealing plate 34 and first opening 60 to ensure the seal. Likewise, rubber seal 44 is used between second sealing plate 38 and second opening 64. Valve 48 is used to control pressure within interior volume 30. Valve 51 is a pressure release to prevent excessive pressure build-up in interior volume 30.

Turbine engine component 10 has internal passage 68, which leads to interior volume 30. Internal passage 68 is normally used to pump oil into turbine engine component 10. Here, for cleaning purposes, internal passage 68 is placed in communication with compressor 46. Compressor 46 is activated and pressurizes interior volume 30 to approximately 10 psig for approximately one minute. In this way, first surface 14 is exposed to first pressure $P_1$. Second surface 18 is naturally exposed to second pressure $P_2$, here atmospheric pressure. As a consequence, there is a pressure differential created between first surface 14 and second surface 18. Here, the pressure difference is simply $P_1$-$P_2$ or $\Delta P$.

Figure 4:
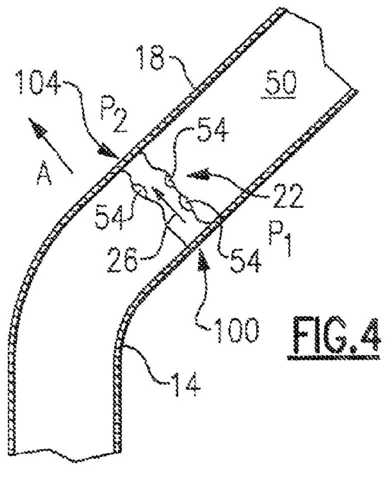
FIG. 4 illustrates a close up view of the turbine engine component of FIG. 3, illustrating a pressurized cleaning liquid passing through a porous structure of the turbine engine component.

Now, with reference to FIG. 4, there is shown an exposed cross-sectional view of turbine engine component 10 with first surface 14 and second surface 18. Porous structure 22, shown schematically, has first porous opening 100 on first surface 14 and second porous opening 104 on second surface 18 and is representative of the numerous pores in composite material 50 extending between first surface 14 and second surface 18. There, as shown, oil residue 54 is contained therein. As a consequence of the pressure differential between first surface 14 and second surface 18, cleaning liquid 26 is pressed outward by pressure within interior volume 30, here first pressure $P_1$. Cleaning liquid 26 thereby passes through porous structure 22 in the direction of arrow A to dissolve and remove oil residue 54 within porous structure 22. Because cleaning liquid 26 is isopropyl alcohol, it will evaporate leaving behind little or no residue.

First sealing plate 34 is then removed and more cleaning liquid 26 poured into interior volume 30. The process of pressure cleaning is then repeated a total of at least three times to ensure removal of oil residue 54. In this way, the inventive cleaning technique removes oil deposits from the pores of turbine engine component in a simple and inexpensive manner.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. A method of repairing a turbine engine component, the method comprising the steps of:

providing a turbine engine component formed of a composite material, the composite material having a first surface and a second surface, a porous structure extending from the first surface to the second surface, the first surface defining an interior volume of the turbine engine component and the second surface defining an exterior surface of the turbine engine component;

sealing the interior volume;

exposing the first surface of the interior volume to a first gas pressure and the second surface to a second gas pressure, the first gas pressure higher than the second gas pressure; and using a difference between the first gas pressure and the second gas pressure to pass a cleaning liquid through the porous structure from the first surface to the second surface.

2. The method of claim 1 including the step of evaporating the cleaning liquid.

3. The method of claim 2 wherein the cleaning liquid is a solvent.

4. The method of claim 1 wherein the composite material is fibrous.

5. The method of claim 1 wherein the porous structure has an oil residue.

6. The method of claim 1 wherein the porous structure has a first porous opening on the first surface and a second porous opening on the second surface.

7. The method of claim 1 wherein the first gas pressure is a gas pressure of the interior volume.

8. The method of claim 7 wherein the second gas pressure is a gas pressure surrounding the second surface.

9. The method of claim 1 wherein the porous structure is sandwiched between the first surface and the second surface.

* * * * *